(12) United States Patent
Griswold et al.

(10) Patent No.: US 6,889,577 B2
(45) Date of Patent: May 10, 2005

(54) ENERGY-ABSORBING HOUSING FOR HIGH-SPEED FLYWHEELS

(75) Inventors: Ray F. Griswold, Phoenix, AZ (US); Edward S. Zorzi, Ballston, NY (US)

(73) Assignee: AFS Trinity Power Corporation, Medina, WA (US)

(*) Notice: Subject to any disclaimer, the term of this patent is extended or adjusted under 35 U.S.C. 154(b) by 0 days.

(21) Appl. No.: 10/465,762

(22) Filed: Jun. 19, 2003

(65) Prior Publication Data

US 2004/0025625 A1 Feb. 12, 2004

Related U.S. Application Data

(63) Continuation of application No. 09/960,043, filed on Sep. 22, 2001, now abandoned.

(51) Int. Cl.[7] .................................................. G05G 1/00
(52) U.S. Cl. ......................................................... 74/572
(58) Field of Search ......................... 74/572, 573, 574; 241/245, 275; 310/74

(56) References Cited

U.S. PATENT DOCUMENTS

| | | | | |
|---|---|---|---|---|
| 3,683,216 A | * | 8/1972 | Post | 310/67 R |
| 4,088,041 A | * | 5/1978 | Kraus | 74/572 |
| 4,090,673 A | * | 5/1978 | Ackers et al. | 241/275 |
| 4,870,310 A | * | 9/1989 | Triplett | 310/74 |
| 5,065,060 A | * | 11/1991 | Takahashi et al. | 310/74 |
| 5,614,777 A | * | 3/1997 | Bitterly et al. | 310/74 |
| 5,639,030 A | * | 6/1997 | Watajima et al. | 241/30 |
| 5,767,595 A | * | 6/1998 | Rosen | 310/74 |
| 6,049,150 A | * | 4/2000 | Chudleigh, Jr. | 310/74 |
| 6,070,820 A | * | 6/2000 | Young et al. | 241/275 |
| 6,175,172 B1 | * | 1/2001 | Bakholdin et al. | 310/74 |
| 2003/0061898 A1 | * | 4/2003 | Brackett et al. | 74/572 |

FOREIGN PATENT DOCUMENTS

JP 62-103479 * 5/1987 ............. F03G/3/08

* cited by examiner

Primary Examiner—David A. Bucci
Assistant Examiner—Vicky A. Johnson
(74) Attorney, Agent, or Firm—Woodcock Washburn LLP

(57) ABSTRACT

The invention provides a flywheel system with energy-absorbing housing. The system provides a novel liner and restraint ribs which serve to de-energize debris particles resulting from the catastrophic failure of a flywheel. Also provided are energy-absorbing housing systems comprising a rotatable liner, one or more restraint ribs, and a fluid film bearing to control and dissipate the energy from the failure of a rotating mass.

9 Claims, 8 Drawing Sheets

ENERGY-ABSORBING HOUSING FOR HIGH-SPEED FLYWHEELS

This is a continuation of application Ser. No. 09/960,043, filed Sep. 22, 2001, now abandoned.

FIELD OF THE INVENTION

The present invention relates generally to flywheel systems. More particularly the invention relates to a high-speed flywheel system having an energy-absorbing housing for dissipating large forces resulting from the catastrophic structural failure of a flywheel system.

BACKGROUND OF THE INVENTION

The applied use of flywheels as a method of storing energy dates back to at least the use of potter's wheels. Modem flywheels are used as energy storage and power management devices. In essence, they couple a motor generator with a large-inertia rotor. Typical applications may include a vacuum enclosure or housing, friction-reducing elements such as magnetic bearings, coolant systems, sensors, charge/discharge circuitry, computer hardware and software for control. Flywheels systems can support industrial voltages.

Flywheels can be designed for primary application either as energy storage or as power storage units, the difference being in the relationship between the large-inertia rotor and the motor generator. Such designs take into consideration for example the time to charge up the device, the speed of the rotating mass, discharge time and the output.

One issue with flywheel systems is the potential of catastrophic structural failure of the large-inertia rotor. Upon failure of a rotor operating at high angular velocities, large forces are generated and large amounts of energy released which raise substantial issues of safety. These forces need to be managed and the energy safely dissipated to allow for broader application of such flywheel systems in industry.

The amount of energy stored in a flywheel is among other attributes proportional to the square of the angular velocity of the flywheel. Hence, flywheel systems are usually designed so that the flywheel rotates at or near a maximum practical velocity. For example, flywheels may be operated at angular velocities of 100,000 revolutions per minute or greater, and with rim velocities of 1,200 meters per second or greater.

The catastrophic structural failure of a flywheel rotating at high velocity (sometimes referred to as a "rapid disassembly" or "rotor burst") will transform the flywheel into high-velocity debris comprising particles, fragments, and dust of various sizes and shapes (the particles, fragments, and dust formed in this manner are hereinafter referred to collectively as "debris particles," for convenience).

The debris particles travel radially outward, i.e., away from the flywheel's axis of rotation, in a manner similar to a pressure wave. (The debris particles also include a tangential velocity component due to the rotation of the flywheel.) The aggregate kinetic energy of the debris particles is approximately equal to the kinetic energy of the flywheel at the time of its failure. Hence, a catastrophic structural failure of a rotating flywheel results in a substantially instantaneous release of the kinetic energy stored in the flywheel.

The high-velocity debris particles liberated from the flywheel can cause substantial damage and injury to nearby structures and personnel. Hence, many flywheel systems include some type of containment device that surrounds the flywheel. Containment devices are adapted to contain and de-energize at least a portion of the debris particles liberated from the flywheel during a catastrophic failure.

FIG. 1 depicts a particular type of conventional containment device 100. The containment device 100 is adapted for use in a test facility where flywheels may intentionally be operated to the point of failure. (This particular application is described for exemplary purposes only. Flywheel containment devices are also used in numerous other applications, e.g., in conjunction with flywheels operated as part of an uninterruptable power supply in an electrical substation or a factory.)

The containment device 100 comprises a substantially cylindrical outer housing 102, and a liner 104 positioned within and fixedly coupled to the outer housing 102. The liner 104 includes a first circumferentially-extending contoured portion 104b located proximate an upper edge of the liner 104. The liner 104 also includes a second circumferentially-extending contoured portion 104c located proximate a lower edge of the liner 104.

The containment device 100 further includes a lid 106 secured to an upper portion of the outer housing 102, and a base plate 107 secured to a lower portion of the outer housing 102. The base plate 107 is fixed to a mounting surface 125 by a plurality of mounting bolts 109.

A composite flywheel 108 is rotatably suspended from the lid 106, and is positioned within the volume defined by the liner 104, the lid 106, and the base plate 107. The flywheel 108 is adapted to rotate in the direction denoted by the arrow 120. (The various components that rotatably couple the flywheel 108 to the containment device 100 are not depicted in FIG. 1, for clarity.)

Composite materials are being used with increasing frequency in the manufacture of flywheels. Composite flywheels, as noted previously, typically disintegrate into a relatively large number of debris particles upon catastrophic structural failure. One such debris particle is depicted diagrammatically in FIG. 1, and is denoted by the numeral 110. (Flywheels formed of steel or other metallic materials, by contrast, usually undergo a so-called "tri-hub" failure in which the flywheel breaks into three relatively large shrapnellike pieces.) The rotational motion of the flywheel 108 at the time of failure gives the debris particles 110 a velocity vector having both radial and tangential components. Hence, the debris particles 110 travel radially outward, toward an inner surface 104a of the liner 104, immediately after the time of failure. (The path of travel of the debris particles 110 is denoted by the arrows 112 included in FIG. 1.)

Initial contact between the inner surface 104a of the liner 104 and the high-velocity debris particles 110 typically deflects the debris particles 110 in the axial ("y") direction. Hence, most of the debris particles 110 initially travel upward and downward, toward the contoured portions 104b, 104c of the liner 104. The curvilinear profiles of the contoured portions 104b, 104c alters the course of the debris particles 110. More particularly, the contoured portions 104b, 104c turn and substantially reverse the course of the debris particles 110. Hence, the debris particles 110 are not stopped by the lid 106 or the base plate 107. The liner 104 thereby reduces or eliminates the stress and shock loading on the lid 106 and the base plate 107 that would otherwise be caused by contact with the high-velocity debris particles 110.

The contoured portions 104b, 104c redirect, but do not substantially dissipate the kinetic energy of the debris par ticles 110. Most of the kinetic energy of the debris particles 110 is dissipated by collisions between the debris particles 110 and the various other portions of the containment device 100 and/or other debris particles. The components of the containment device 100 must have a thick or otherwise robust construction to withstand these collisions, and to absorb the energy associated therewith. This type of construction makes the containment device 100 heavy, and can thereby cause difficulties in transporting or otherwise moving the containment device 100. Excessive weight can also necessitate reinforcement of the mounting surface 125 surface and the mounting bolts 109. Furthermore, increasing the thickness of a structural component requires additional material, and thereby raises the initial cost of the containment device 100.

Dissipating the kinetic energy of the debris particles 110 through collisions with the containment device 100 raises safety-related issues. In particular, the collisions between the high-energy debris particles 110 and the components of the containment device 100 generates a risk that one or more of the debris particles 110 may penetrate and thereby escape from the containment device 100. Upon escape, the high-velocity debris particles 110 from the containment device 100, as noted previously, can cause substantial property damage and injury to personnel.

Furthermore, as indicated the failure of a high-speed rotor and associated hub structure causes debris to initially depart from the flywheel 108 in a trajectory essentially tangential to the rotor. The debris mass then contacts the enclosure wall closest to the rotor, generally a few degrees less than perfectly tangential. The forces imparted to the wall of the housing impact a substantial tangential force, which tends to rotate the housing. With further reference to FIG. 1, the tangential velocity component of the debris particles 110 exerts a torque on the containment device 100. In extreme cases, this very high torsional stress on the housing mounting may subject it to failure by shear or separation of the containment device 100 from its mounts. If the mounting is designed to fully constrain this torsional load, it becomes excessively hefty and overweight for many practical flywheel applications.

This problem is of concern in the industry, hence an ongoing need exists for a flywheel system with a housing capable of absorbing and/or dissipating the energy inherent in the failure of high speed rotor, without causing substantial property damage and injury to personnel, and avoiding the problems of such heavily-engineered housings as to be impractical for use

SUMMARY OF THE INVENTION

A presently preferred embodiment of a flywheel system with energy-absorbing housing comprises a substantially cylindrical housing comprising a wall portion, and a substantially cylindrical liner positioned within the housing and disposed to rotate. The flywheel with energy-absorbing housing further comprises one or more restraint ribs for restraining rotation of the liner, the restraint ribs comprising a first end fixedly coupled to the wall portion of the housing and a second end fixedly coupled to the liner. The restraint ribs are adapted to release restraint on the liner when subjected to stress of a predetermined intensity. The system further comprises a flywheel rotatably disposed within the liner.

Another presently preferred embodiment of the flywheel system with energy-absorbing housing comprises a flywheel rotatably disposed about an axis within an energy-absorbing housing. The energy-absorbing housing comprises a substantially cylindrical outer housing comprising a wall portion, and a substantially cylindrical liner rotatably disposed within the housing and substantially encircling the flywheel. The system further comprises a plurality of restraint ribs comprising a first end fixedly coupled to the liner and a second end fixedly coupled to the wall portion; the restraint ribs for restraining rotation of the liner and adapted to release restraint on the liner when subjected to stress of a predetermined intensity.

Another presently preferred embodiment of a flywheel system with energy-absorbing housing comprises a substantially cylindrical liner, disposed for rotation within a substantially encircling, substantially cylindrical housing comprising a wall portion. The system further comprises a flywheel, rotatable about an axis and substantially encircled by the liner. The system further comprises one or more restraint ribs for restraining rotation of the liner; the ribs comprising at least a first end fixedly coupled to the liner and at least a second end fixedly coupled to the wall portion; the ribs adapted to release restraint on rotation of the liner when subjected to stress at a predetermined intensity.

In another presently preferred embodiment of the flywheel system with energy-absorbing housing, the system comprises a flywheel rotatably disposed about an axis and an energy-absorbing housing. The energy-absorbing housing comprises an outer housing having a substantially cylindrical wall portion and a liner disposed within the outer housing and substantially encircling the flywheel, the liner adapted for rotation within the housing. The system further comprises a lubrication material disposed between the outer housing and the liner, the lubrication material facilitating rotation of the liner.

In yet another presently preferred embodiment of a flywheel system with energy-absorbing housing, the system comprises a substantially cylindrical housing comprising a wall portion, and a substantially cylindrical liner positioned within the housing and disposed to rotate. The system further comprises one or more restraint ribs for restraining rotation of the liner, the restraint ribs comprising a first end fixedly coupled to the wall portion of the housing and a second end fixedly coupled to the liner. The restraint ribs are adapted to release restraint on the liner when subjected to stress of a predetermined intensity. The restraint ribs are further adapted to melt when subjected to a predetermined temperature, the melted ribs being adapted to form a lubrication material disposed between the outer housing and the liner to facilitate rotation of the liner. The system further comprises a flywheel rotatably disposed within the liner.

Another presently preferred embodiment of a flywheel system with energy-absorbing housing comprises a flywheel rotatable about an axis and a substantially cylindrical enclosure positioned radially outward. The enclosure comprises a housing and liner, the liner adapted for rotation when subjected to torsional stress forces.

A presently preferred embodiment of an energy-absorbing housing for a rotating mass comprises a housing comprising a circumferentially-extending wall portion. The energy-absorbing housing also comprises a lid fixedly coupled to the housing, and a liner at least partially disposed within the housing and further disposed for rotation. The system further comprises at least one or more restraint ribs for restraining rotation of the liner, the ribs comprising a first end fixedly coupled to the liner and a second end fixedly coupled to the housing; the ribs being adapted to release restraint on the liner when subjected to stress of a predetermined intensity and further being adapted to melt when subjected to a predetermined temperature.

Another presently preferred embodiment of an energy-absorbing housing for a rotating mass comprises a housing comprising a circumferentially-extending wall portion. The energy-absorbing housing also comprises a lid fixedly coupled to the housing, and a liner at least partially disposed within the housing and further disposed for rotation. The system further comprises a lubrication material for facilitating rotation of the liner, the lubrication material being disposed between the housing and the liner.

A presently preferred embodiment of a device for containing and de-energizing debris resulting from the catastrophic failure of a rotatable mass comprises a housing with a substantially cylindrical wall portion, a lid fixedly coupled to the housing, and a liner at least partially disposed within the housing and adapted for rotation. The system further comprises restraint ribs for restraining rotation of the liner, the ribs comprising one or more ends fixedly coupled to the liner and one or more ends fixedly coupled to the housing; the ribs being adapted to release restraint on the liner when subjected to stress of a predetermined intensity and further being adapted to melt when subjected to a predetermined temperature. The melted ribs comprise a lubrication material disposed between the liner and the housing; the lubrication material adapted to form a fluid film layer therebetween.

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings.

DETAILED DESCRIPTION OF PREFERRED EMBODIMENTS

FIGS. 2–8 each depict a presently-preferred embodiment of an energy-absorbing housing system for a flywheel system. The figures are each referenced to a common coordinate system 9 depicted therein. The invention is described herein in connection with a flywheel system 20 comprising a flywheel 22. This particular embodiment is described for illustrative purposes only, and is not intended to limit the contemplated scope of the invention in any way. The present invention can be used in conjunction with virtually any type of mechanical system in which it is necessary or desirable to contain or de-energize debris resulting from the catastrophic failure of a rotating mass, as with, for example, high-speed centrifuges, centrifugal separators, rotary filling machines, and the like.

Figure 1:
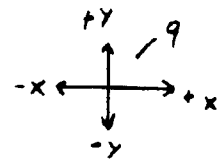
FIG. 1 is a diagrammatic cross-sectional view of a conventional containment device for a rotatable mass.
Figure 1:
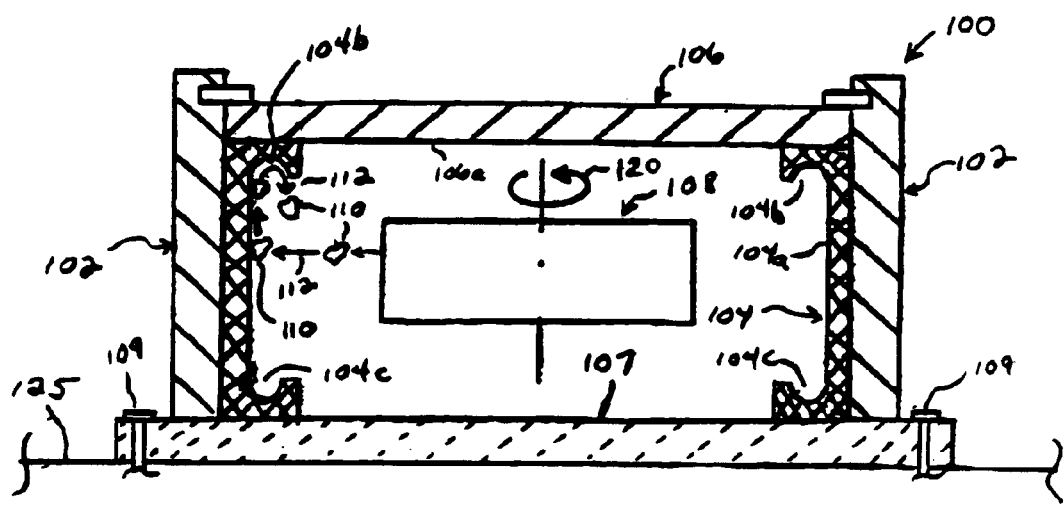
Figure 2:
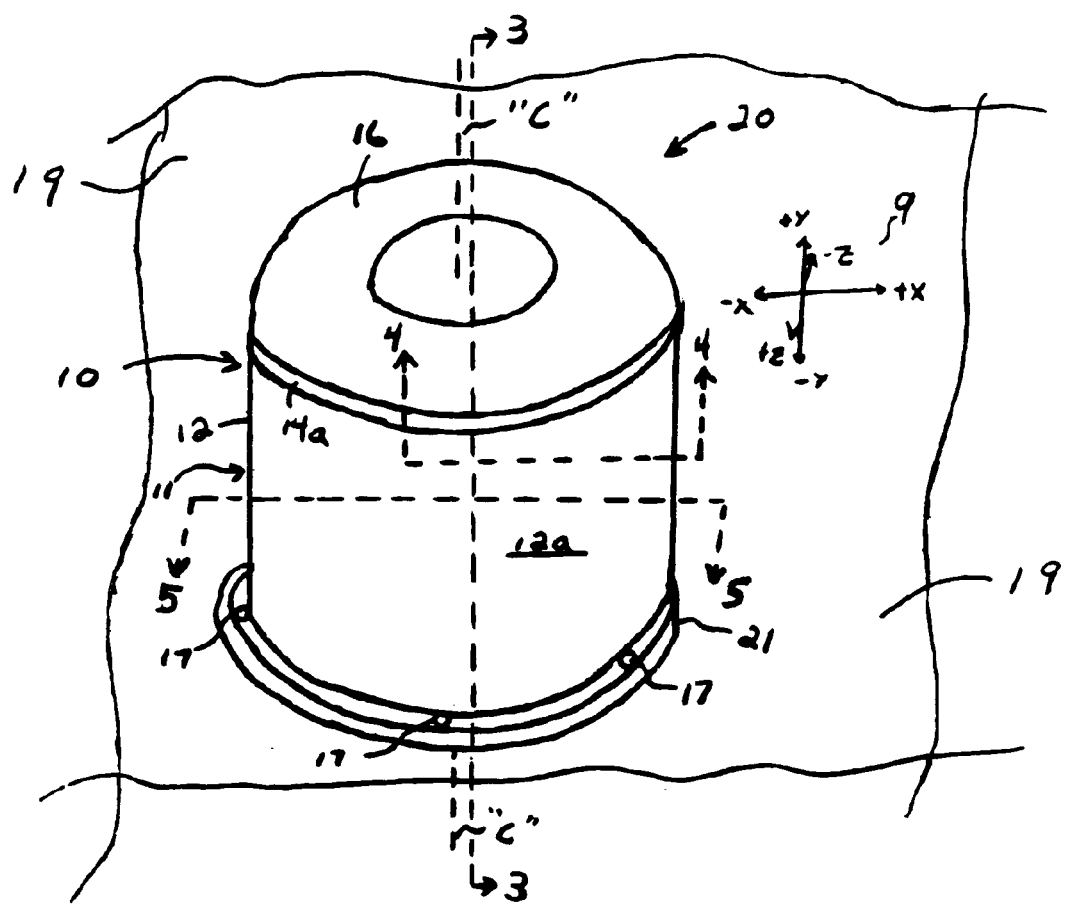
FIG. 2 is a diagrammatic perspective view of a flywheel system comprising a presently preferred energy-absorbing housing system in accordance with the present invention.
Figure 3:
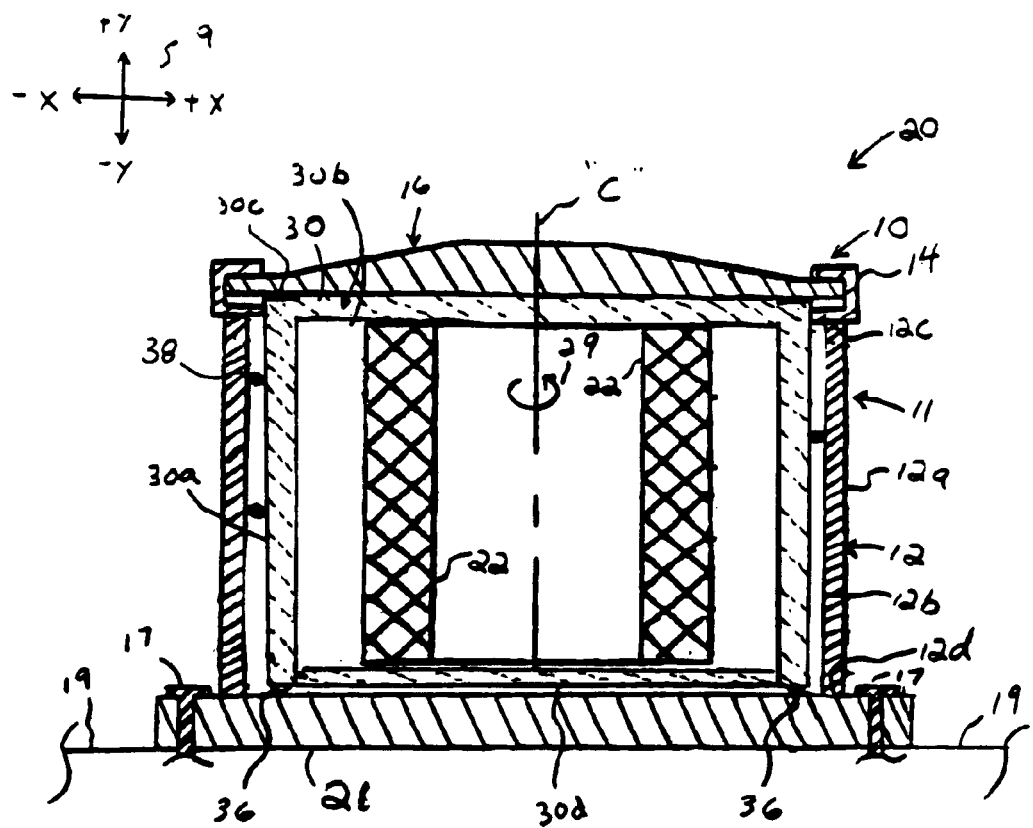
FIG. 3 is a cross-sectional view of the flywheel system shown in FIG. 2, taken along the line 3—3 of FIG. 2.
Figure 4:
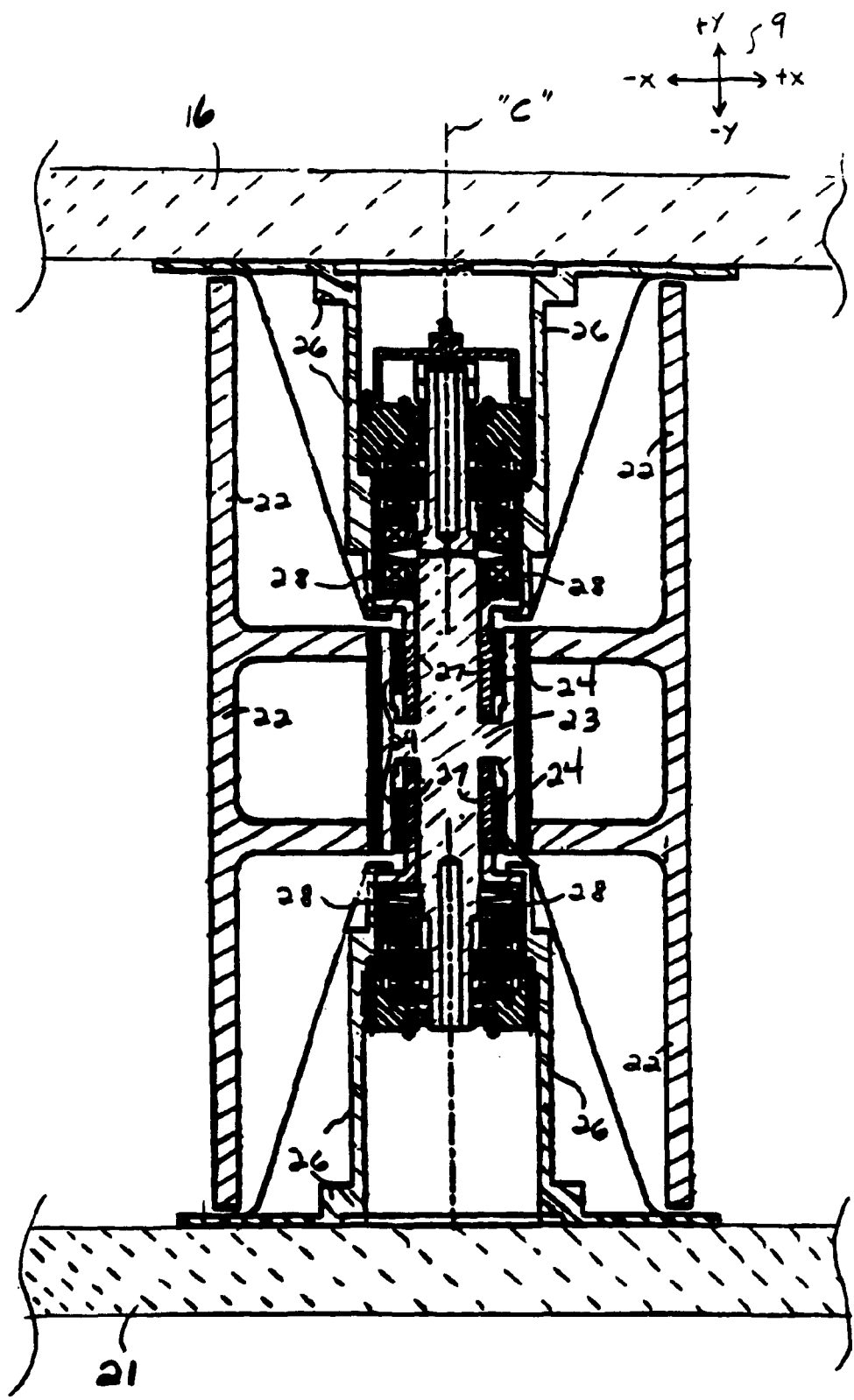
FIG. 4 is cross-sectional view of the flywheel system shown in FIGS. 2 and 3, taken along the line 3—3 of FIG. 2 and depicting further details of the flywheel system.

FIGS. 2 and 3 show an energy-absorbing housing system 10, generally. The energy-absorbing housing system 10 comprises a substantially cylindrical outer housing 11. The outer housing 11 is substantially centered around a centerline (longitudinal axis y of coordinate system 9) of housing system 10. The centerline of the system 10 is denoted by the symbol "C" in the FIG. 3.

The housing 11 comprises a wall portion 12 having a circumferentially-extending outer surface 12a and a circumferentially-extending inner surface 12b. The wall portion 12 also includes an upper surface 12c and a lower surface 12d. The upper and lower surfaces 12c, 12d each adjoin the outer and inner surfaces 12a, 12b. The housing 11 further comprises a flange 14 fixedly coupled to and extending along the upper surface 12c of the wall portion 12. (Note: Directional terms appearing through the specification and claims are used with reference to the component orientations depicted in FIG. 2; these terms are used for illustrative purposes only and, unless expressly stated otherwise, are not intended to limit the scope of the appended claims in any manner.)

The energy-absorbing housing system 10 also comprises a lid 16 and a base plate 21. The flange 14 is adapted to securely receive an outer edge of the lid 16, thereby securing the lid 16 to the housing 11. A seal (not shown, for clarity), such as an o-ring or other device, is located between the lid 16, flange 14 and upper surface 12c of the housing 11, to maintain a vacuum to reduce frictional losses and heating of the rotor. The base plate 21 is fixed to the lower surface 12d of the outer wall 12 by conventional means such as welding. The housing system 10 may be secured to a mounting surface 19 by a plurality of mounting bolts 17 accommodated by through holes in the base plate 21.

The energy-absorbing housing system 10 further comprises a liner 30 positioned within the housing 11. The liner 30 includes a circumferentially-extending outer surface 30a and a circumferentially-extending inner surface 30b (see FIGS. 2 and 4). The outer surface 30a of the liner 30 is positioned radially inward of the inner surface 12b of the housing 11. In one presently preferred embodiment, the outer surface 30a of the liner 30 and the inner surface 12b of the housing 11 are radially spaced by approximately 0.10-inch, i.e., a clearance of approximately 0.10 inch preferably exists between the outer surface 30a and the inner surface 12b (this clearance is depicted in FIG. 3 (not to scale), and is exaggerated therein for clarity). The clearance in the foregoing description is exemplary and limiting to the invention in any way. A controlled clearance facilitates a friction-controlled or lubricated surface. In other embodiments, the optimal clearance may be greater or lesser depending on factors such as choice of material for the restraint ribs 38 (see below) and the desired thickness of the fluid film bearing (see below).

The liner 30 also includes an upper surface 30c and a lower surface 30d (see FIG. 3). The upper and lower surfaces 30c, 30d are substantially perpendicular to the central axis "C" of the energy-absorbing housing system 10. The liner 30 is preferably formed of high-strength steel and is disposed to rotate substantially about the central axis "C" of the energy-absorbing housing system 10.

The rotation of the liner 30 about the axis "C" is restrained by the one or more restraint ribs 38. The restraint ribs 38 have at least a first end fixedly coupled to the liner 30 and a second end fixedly coupled to the housing 11. The first end of the restraint ribs 38 is coupled to the inner wall 12b of the housing 11 and the second end of the restraint ribs is fixedly coupled to the outer wall 30a of the liner 30 (see FIG. 6). Alternatively, the restraint ribs 38 may be located in immediate proximity to the liner 30 and housing 11, but are not physically coupled thereto. In such embodiments, the ribs 38 may be substantially spherical with one or more flattened areas that restrain the free rotation of the liner 30.

The ribs 38 are adapted to release restraint on rotation of the liner 30 when subjected to a stress of a predetermined intensity. Alternative embodiments of the ribs 38 may be adapted to melt when subjected to a predetermined temperature.

In an exemplary embodiment, the liner 30 is supported on a plurality of knobs 36 projecting from the bottom surface 30d of the liner 30 (see FIG. 2). Each of the knobs 36 preferably has a rounded profile, as depicted in the figures. The knobs 36 may be unitarily formed with the liner 30. Alternatively, the knobs 36 may be unitarily formed with the base plate 21. The knobs 36 can also be fixed to the liner 30 or the base plate 21 by conventional means such as fasteners. The knobs 36 rest on the base plate 21 when the liner 30 is in place within the housing 11. Hence, the liner 30 is not fixed to the housing 11, the lid 16, or the base plate 21. The significance of this feature is explained below.

In lieu of, or in addition to knobs 36, specialty surfaces or parts may be used to support, at least in part, the liner 30, for example, substantially spherical parts with one or more flattened portions, dry lubricated surfaces, or restraint ribs 38 (see below). In yet other embodiments, the liner 30 is supported by a simple groove (not shown) machined into the baseplate 21. In other embodiments, the baseplate may have a controlled friction insert, or a controlled friction 'shoe' (with analogy to a brake shoe) (not shown). It is understood that the liner 30 supports are not limited to positions near the bottom of the liner, and may in fact be used to substantially support any portion of the liner 30, as the invention is contemplated for flywheel system 20 orientations different with respect to gravity and the axes x, y and z of coordinate system 9 from those exemplified herein.

The energy-absorbing housing system 10 forms part of a flywheel system 20, in the exemplary embodiment. The flywheel system 20 comprises the flywheel 22, a shaft 23 fixedly coupled to the flywheel 22, and a plurality of permanent magnets 24 fixedly coupled to the shaft 23 (see FIG. 4). The flywheel system 20 also comprises a stator 26, a winding 27 positioned around the stator 26, and a bearing 28 that rotatably couples the shaft 23 and the stator 26. (The shaft 23, magnets 24, stator 26, winding 27, and bearing 28 are not depicted in FIG. 3, and the flywheel 22 is not drawn to scale therein, for clarity.)

The flywheel 22 is preferably formed from a composite material such as graphite epoxy. The flywheel 22 is adapted to rotate in the direction denoted by the arrow 29 shown in FIG. 3. The stator 26 is fixedly coupled to the lid 16 and the base plate 21 of the energy-absorbing housing system 10. (This particular mounting configuration is exemplified for illustrative purposes only; numerous variations in the mounting configuration are possible.) The stator 26 is substantially centered relative to the lid 16. Hence, the flywheel 22 has an axis of rotation that extends substantially along the centerline "C" of the containment device 10.

The flywheel system 20 functions as an electromechanical battery. More particularly, the flywheel system 20 converts electrical energy into mechanical energy, and stores the mechanical energy in the flywheel 22. This is accomplished by energizing the windings 27. The resulting electrical field interacts with the magnets 24 and thereby generates a rotational force that acts on the shaft 23. This force imparts rotational motion to the shaft 23 and the flywheel 22, thereby energizing the flywheel 22.

The flywheel system 20 subsequently converts the mechanical energy stored in the flywheel 22 back into electrical energy. More particularly, the momentum of the rotating flywheel 22 imparts rotational motion to the shaft 23 and the magnets 24 when the windings 27 are de-energized. The magnetic field generated by the magnets 24 interacts with the stationary windings, and thereby induces an electrical current in the windings.

Figure 6:
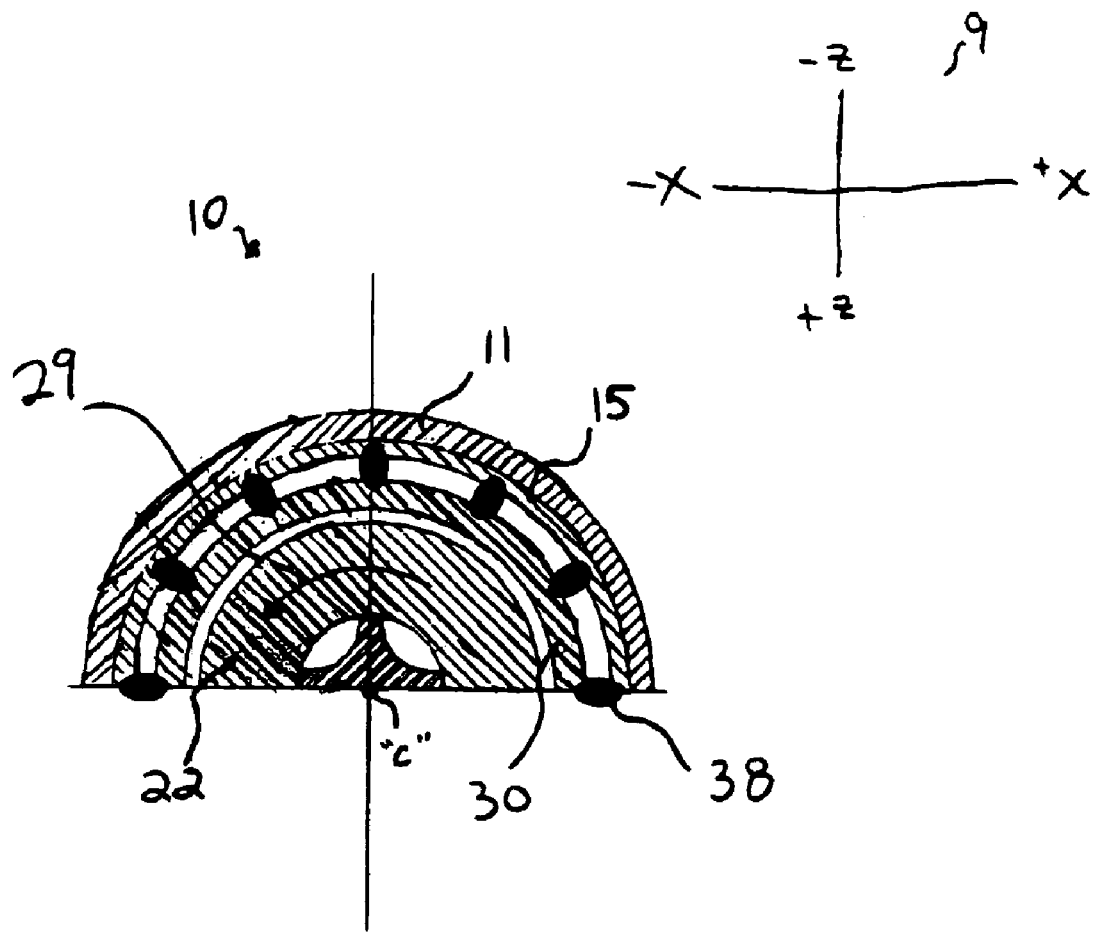
FIG. 6 is a partial cross-sectional view of a liner of the flywheel system shown in FIGS. 2–5, taken along the line 5—5 of FIG. 2 and depicting a plurality of restraint ribs fixedly connected to the liner and to the housing, prior to a catastrophic failure of the flywheel.

With reference to FIG. 6, a partial cross-sectional housing system 10 is depicted. The liner 30 is positioned radially inward of the housing 11. Alternative embodiments may further comprise a liner shoe 15 located radially outward of the liner 30. The liner shoe 15 may be integral with, attached to, connected to or coupled to the housing 11, particularly the inner wall 12b of the housing 11. The liner shoe comprises a material to which the restraint ribs 38 may attach. It may further provide properties desirable for absorbing energy, or for the formation of the lubrication layer 40 (see FIG. 7 and below).

The restraint ribs 38 are also depicted in FIG. 6. The optimal number and size of the restraint ribs 38 is determined by the desired total cross-sectional area of the restraint ribs 38, which is a function of the known shear strength of the material selected for the restraint ribs 38. This provides another point of controlling the exact manner in which the forces will be dissipated. Debris particles 39, which originate in a failure of the flywheel 22, impart a torque to the liner 30 as explained below. Upon the application of force from the debris particles 39 to the liner 30, the restraint ribs 38 are adapted to release restraint on rotation of the liner 30. Various mechanisms for release of restraint of rotation by the restraint ribs 38 are possible. For example, one or a combination of shear failure, tear-out, plastic deformation, or melting may effect release.

Restraint ribs 38 constructed of various materials may meet the above requirements. The restraint ribs 38 may be comprised of one or more of low melt alloys or metals such as solder, rose metal, cerobend, and similar alloys, or other thermoplastic materials. The choice of material for the restraint ribs 38 provides an opportunity to manage energy released by the flywheel upon failure. By carefully selecting the cross-sectional area, mass and physical properties of the restraint ribs 38, including the elastic, plastic, shear and melting properties, as well as the dynamic and shear viscosities, the energy-absorbing housing system 20 provides the maximal control of the containment and de-energization of the debris resulting from catastrophic failure.

Figure 7:
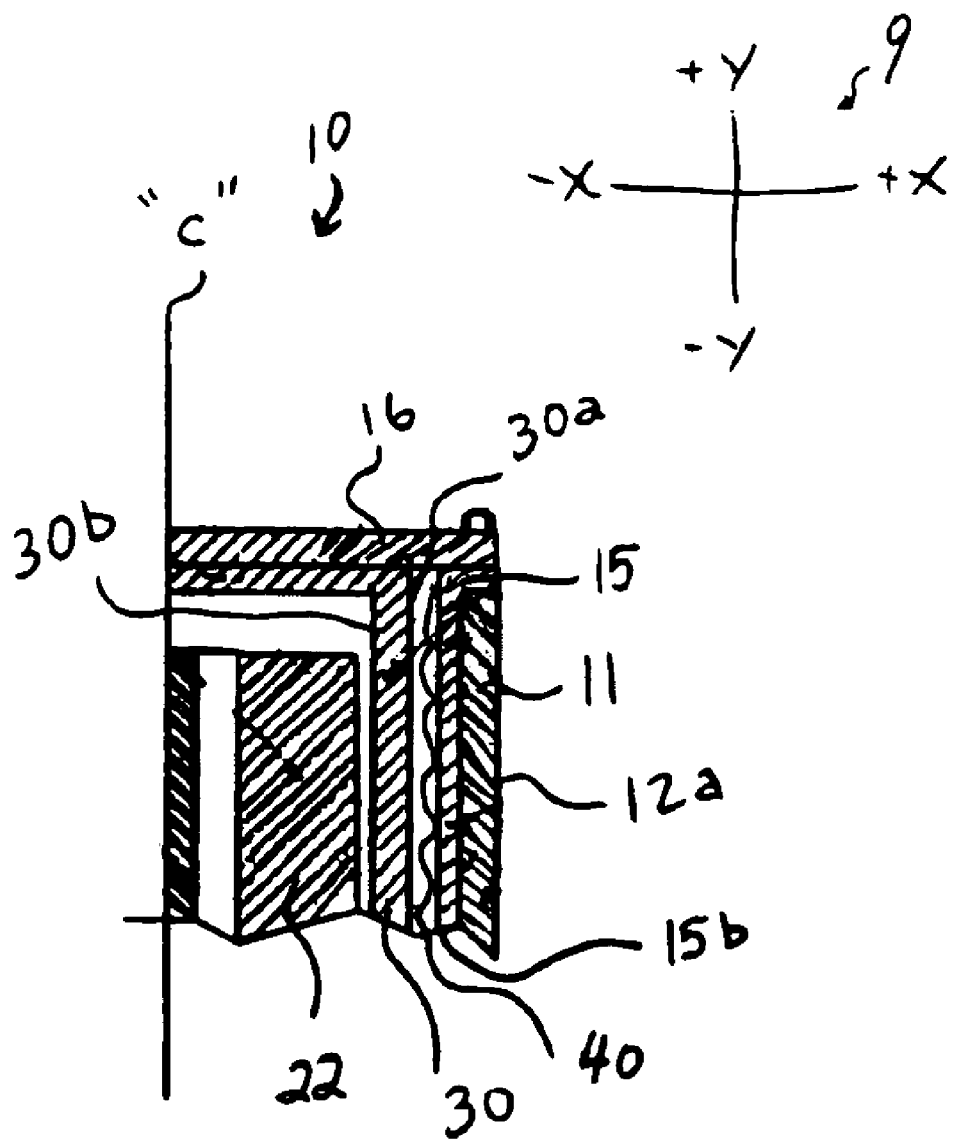
FIG. 7 is a partial cross-sectional view of a liner of the flywheel system shown in FIGS. 2–6, taken along the line 3—3 of FIG. 2 and depicting a lubrication layer as a fluid film bearing between the liner and the housing of the system.

Optimally, the restraint ribs 38 are adapted to melt to form a lubrication layer 40 as shown in FIG. 7. The lubrication layer 40 is located between the outer surface 30a of the liner 30 and the inner surface 15b of the liner shoe 15 (or the inner surface 12b of the housing 11 in embodiments lacking a liner shoe 15). The lubrication layer 40 lubricates the interface between the liner shoe 15 (or the housing 11) and the liner 30, which rotates after release from its restraint. In addition, the lubrication layer 40 forms a fluid film surrounding the liner, and thereby develops a hydrodynamic pressure and acts as a fluid film bearing that helps to center and stabilize the rotation of the liner 30. Since the viscosity of the lubricant layer 40 offers the ability to improve the degree to which the bearing properties operate and also provides a method of controlling the safe dissipation of the debris particles 39 energy, selection of the appropriate material for the lubrication layer 40 and the restraint ribs 38 allows the catastrophic failure event to be managed, not merely contained. Controlled inefficiency, or managed losses, in the fluid film bearing serve to further the energy-absorption.

An additional advantage of the present invention is that since the housing in a typical flywheel application is under a high degree vacuum, many traditional liquid lubricants might cause problems with out-gassing. By providing a lubricant layer 40 which forms as a result of the melting of a low out-gassing solid, this problem is overcome. This allows the present invention to be used in high vacuum systems.

Figure 8:
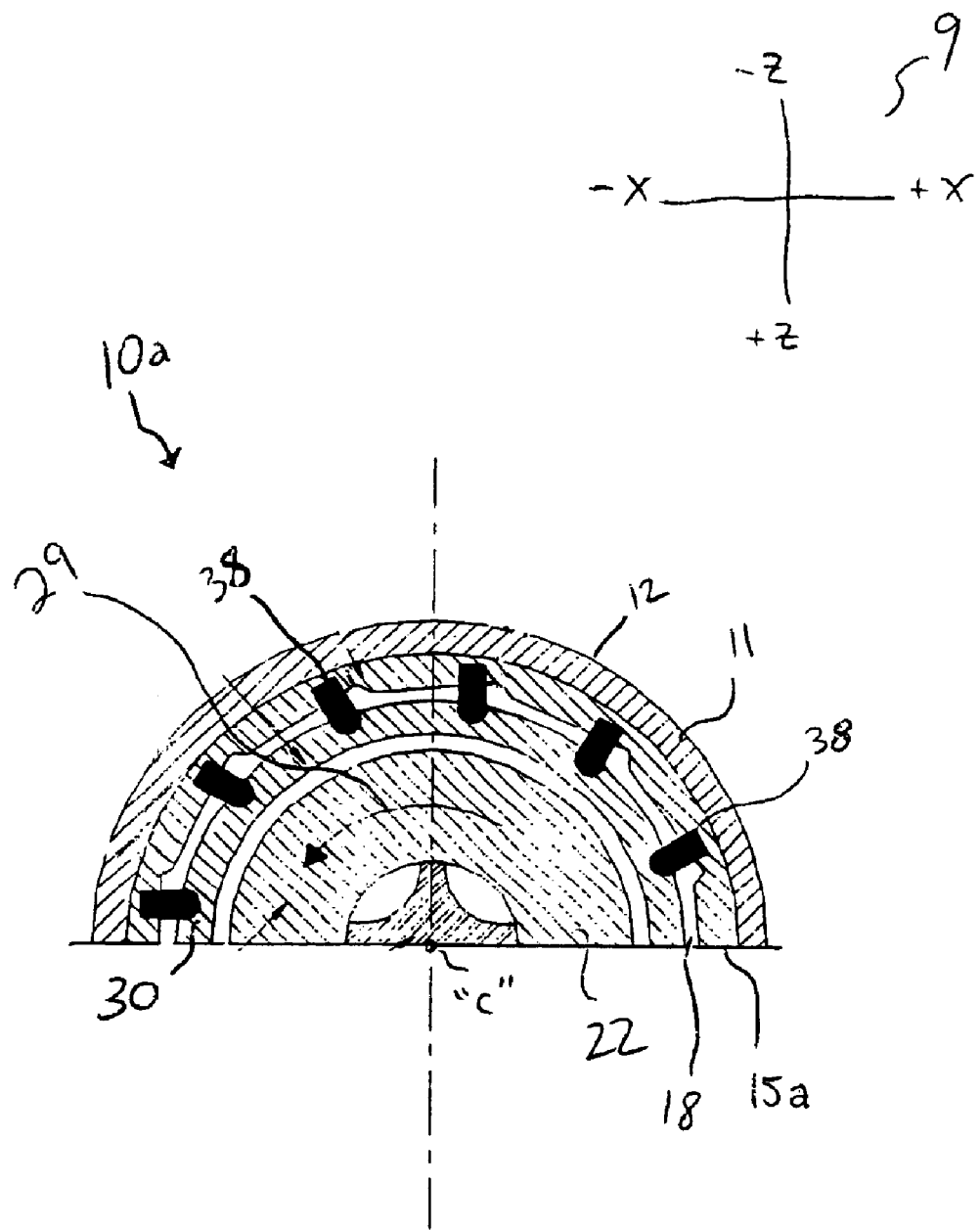
FIG. 8 is a partial cross-sectional view of a liner of the flywheel system shown in FIGS. 2–7, taken along the line 5—5 of FIG. 2 and depicting a plurality of restraint ribs fixedly connected to the liner and to the housing, prior to a catastrophic failure of the flywheel, and further depicting an exemplary design configuration of the housing/liner interface which improves the hydrodynamic loading of the lubrication layer between the liner and the housing.

With reference to FIG. 8, a partial cross-section of an alternative embodiment, energy-absorbing housing system 10a, is depicted. Components of the housing system 10 that are substantially identical to those of the housing system 10a are denoted herein by common reference numerals. The clearance and contour of the interface 18 between the liner 30 and the liner shoe 15a (or housing 11 in other embodiments) are controlled as a way to further optimize the energy-absorbing properties of the housing system 10a. Control over rotation of the liner 30 with respect to the liner shoe 15a is facilitated by the introduction of a series of fixed pads, ramps, impressions and the like which are placed or fabricated into the liner shoe 15a Such modifications in the clearance and contour of the liner shoe 15a provide substantial improvements in hydrodynamic loading of the liner 30, thereby stabilizing the liner 30 while rotating. Other modifications of these parameters of clearance and contour may favor hydrodynamic lift. The net effect is that of creating a self-centering bearing with controlled inefficiency, which reduces the risk of the liner 30 colliding with wall 12 of the housing 11, and further absorbs the energy of the debris particles 39. Alternatively, the foregoing modifications may be made to the outer surface 30a of the liner 30. Additional modifications, such as upsetting the surfaces of liner 30 or the liner shoe 15a, for example by knurling, or other modifications to createnon-laminar flow within the lubrication layer 40 (fluid film bearing 40) also offer additional energy dissipation and are contemplated in presently preferred embodiments.

Operational details concerning the energy-absorbing housing system 10 are as follows. The energy-absorbing housing system 10 is adapted to contain and de-energize high-speed debris particles formed by the flywheel 22 during a catastrophic structural failure thereof. The housing system 10 achieves this effect, in part, by virtue of the energy dissipation of the restraint ribs 38, and the rotation of the liner 30, as well as controlled energy losses to heat, and friction. Specific details concerning these features are exemplified below.

Flywheels manufactured from composite materials, as noted previously, typically disintegrate into a large number of relatively small debris particles during a catastrophic structural failure.

Figure 5:
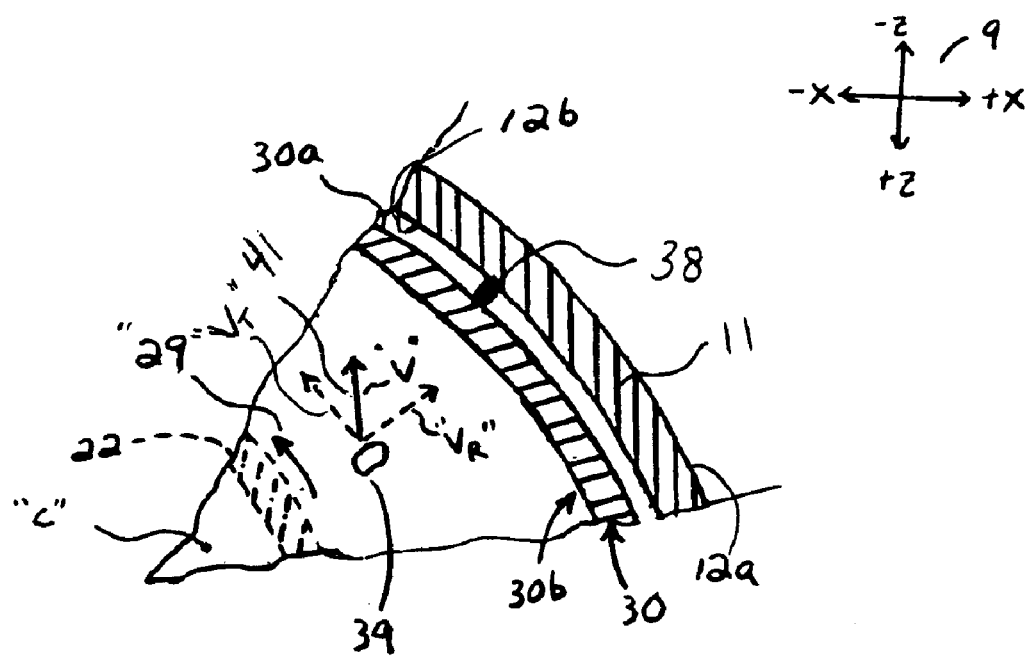
FIG. 5 is a partial cross-sectional view of a liner of the flywheel system shown in FIGS. 2–4, taken along the line 4—4 of FIG. 2 and depicting a velocity vector of a debris particle from a flywheel of the flywheel system immediately after a catastrophic structural failure of the flywheel.

The rotational motion of the flywheel 22 at the time of failure gives the debris particles a velocity vector "V" having both a radial component "$V_R$" and a tangential component "$V_T$", as depicted in FIG. 5. Hence, the debris particles 39 travel radially outward, toward the inner surface 30b of the liner 30, immediately following a catastrophic structural failure of the flywheel 22. FIG. 5 diagrammatically depicts a representative debris particle 39 traveling radially outward immediately after a structural failure of the flywheel 22; the direction of travel of the debris particle 39 is denoted by arrow 41.

The debris particles 39 subsequently impinge upon the inner surface 30b. The forces imparted by the collision of the debris particles 39 striking the inner surface 30b induce a torsional force on the liner 30 which is in turn transmitted to the restraint ribs 38. The restraint ribs 38, by a variety of mechanisms, succumb to the forces and release the restraint on the liner 30. The liner 30 is then able to rotate to further dissipate the kinetic energy of the debris particles 39. In presently preferred embodiments, upon release of the rotational restraints, the restraint ribs absorb further energy in undergoing a state change and melt to form the lubrication layer 40 that functions as fluid film bearing 40 (depicted in FIG. 7). This layer both facilitates the rotation of the liner 30 and provides a further means of managing the further dissipation of energy through controlling the frictional losses. The energy-absorbing housing system 10 thus dissipates the kinetic energy of the debris particles 39, in part, by overcoming the restraint on the rotation, by converting the kinetic energy into heat for the state change, and by converting kinetic energy into the mechanical energy required to rotate the liner 30. A portion of the energy associated with the radial velocity component of the debris particles 39 is thereby dissipated through interactions the restraint ribs 38 which protect the structure of the housing system 10, and another portion is dissipated through the rotation of the liner. The substantial advantages associated with this feature are discussed below.

The liner 30 is not fixed to the lid 16, or the base plate 21, as noted previously. However, the liner 30 is fixedly coupled to the housing 12, via the restraint ribs 38. The liner cannot freely rotate due to the restraint of the restraint ribs 38. This feature does indefinitely prohibit the liner 30 from rotating in response to the impact of the debris particles 39 thereon. The ability of the liner 30 to rotate upon release of the initial restrain further dissipates the energy of the debris particles 39, for the following reasons.

The debris particles 39 have a substantial tangential velocity component immediately after being formed, as previously noted. The tangential velocity component causes the debris particles 39 to contact the liner 30 at an acute angle. In other words, the debris particles 39 have a circumferential, as well as a radial, velocity component when the debris particles 39 initially contact the inner surface 30b of the liner 30.

The circumferential velocity component of the debris particles 39 causes the debris particles 39 to exert a circumferentially-acting force on the liner 30. More particularly, friction between the debris particles 39 and the inner surface 30b of the liner 30 causes the debris particles 39 to exert a drag force on the liner 30. This drag force may initially be strong enough to overcome the restraint on the rotation of the liner 30 by the restraint ribs 38, thereby allowing rotation of the liner 30.

The noted friction between the debris particles 39 and the inner surface 30b of the liner 30 lowers the circumferential velocity of the debris particles 39. This friction also results in a transfer of energy from the debris particles 39 through the liner 30 to the restraint ribs 38. The restraint ribs 38 are adapted to release restraint on the rotation of the liner. In various presently preferred embodiment, the release of the restraint may be due to plastic deformation, shear, melting, failure, or tear out of the restraint ribs 38. Accordingly a portion of the energy imparted by the debris particles 39 is absorbed by the restraint ribs 38.

In accordance with the present invention, the restraint ribs 38 comprise materials with desired properties including, for example, composition, melting point, dynamic viscosity, rotational viscosity, elasticity, plasticity, shear strength, lubricity and specific heat capacity. Presently preferred materials for the construction of the restraint ribs 38 include, but are not limited to: metals and metal alloys, such as solder, rose metal, cerobend and similar alloys, thermoplastics and other polymers. Other materials, both naturally-occurring and synthetic, which provide the desired properties are contemplated for use herein. Restraint ribs 38 which do not melt, but have the ability to form a dry lubricant are also contemplated for use herein.

In addition to the absorption of energy by the restraint ribs 38, upon the release of the rotational restraint, the liner 30 is substantially free to rotate. The debris particles 39 energize the liner 30 and the restraint ribs 38 by imparting torque thereto, and in the process are de-energized by a corresponding amount. The aggregate rotational energy of the debris particles 39 is thus dissipated more gradually than would be possible with a non-rotatable liner. In other words, the rotational energy of the debris particles 39 is not passed on abruptly to the mounting bolts 17 that secure the energy-absorbing housing system 10 to the mounting surface 19. The liner 30, and the restraint ribs 38, in effect, substantially decouple the housing 11 (and the mounting bolts 17) from the torque generated by the drag force between the debris particles 39 and the liner 30. Hence, requiring the restraint ribs 38 to shear, succumb, fail or in some manner release their restraint thereby permitting the liner 30 to rotate in response to contact with the debris particles 39 substantially reduces the stresses on the housing 12 and the mounting bolts 17.

The liner 30, as indicated by the above discussion, dissipates the energy of the debris particles 39 in part, due to its relationship with the restraint ribs and the housing 11, and its ability to rotate in relation to the housing system 10. This feature provides substantial advantages in relation to conventional containment devices.

For example, the energy-dissipating effect of the liner 30 allows the housing 11, the lid 16, and the base plate 21 of the energy-absorbing housing system 10 to be thinner than the corresponding structure in a conventional containment device of similar capability. Hence, from a standpoint of structural support, the amount of material needed to manufacture the energy-absorbing housing system 10 is less than that required for a conventional containment device. The cost and weight of the housing system 10 are therefore potentially lower than those of a conventional containment device. (Reductions in weight are particularly advantageous, as such reductions can eliminate the need to reinforce the supporting surface upon which the containment device is mounted. Weight reductions also make it easier to relocate the containment device, if necessary.)

The energy-dissipating effect of the liner 30 also provides substantial safety-related advantages. For example, dissipating the aggregate energy of the debris particles 39 lessens the possibility that one or more of the debris particles 39 will penetrate and travel outwardly from the housing system 10. Hence, the potential for property damage and physical injury to personnel can be reduced through the use of the liner 30.

The potential for damage to the energy-absorbing housing system 10 is also lessened by substantially reducing shock loading of the housing 11 and the mounting bolts 17, by providing the restraint ribs 38, by design to give way in some manner, as explained above. The liner 30 also reduces to an extent the possibility that the debris particles 39 will contact and damage the lid 16 and the base plate 21. Furthermore, the primary energy-dissipating structure of the energy-absorbing housing system 10, i.e., the liner 30, can readily be over-wrapped with an energy-absorbing blanket to further reduce the possibility that any of the debris particles 39 will escape from the housing system 10.

It is to be understood that even though numerous characteristics and advantages of the present invention have been set forth in the foregoing description, together with details of the structure and function of the invention, the disclosure is illustrative only, and changes may be made in detail, especially in matters of size, shape, and arrangement of parts, within the principles of the invention.

What is claimed is:

1. A flywheel system comprising:
   a substantially cylindrical housing comprising a wall portion;
   a substantially cylindrical liner positioned within the housing;
   a flywheel rotatably disposed within the liner; and,
   means contacting the wall portion and the liner for restraining the liner in relation to the housing when the liner is subjected to a torque below a predetermined threshold and releasing the liner when the liner is subjected to a torque substantially equal or greater than the predetermined threshold.

2. The flywheel system of claim 1 wherein the means is fixedly coupled to the wall portion and the liner.

3. The flywheel system of claim 2 wherein the means comprises a restraint rib that releases the liner as a result of shear failure.

4. A flywheel system comprising:
   a substantially cylindrical housing comprising a wall portion;
   a substantially cylindrical liner positioned within the housing;
   a flywheel rotatably disposed within the liner; and,
   means contacting the wall portion and the liner for restraining the liner in relation to the housing when the liner is subjected to a torque below a predetermined threshold and releasing the liner and forming a fluid film between the liner and the wall portion when the liner is subjected to a torque substantially equal or greater than the predetermined threshold.

5. The flywheel system of claim 4 wherein the means comprises a restraint rib formed from a material selected from the group consisting of solder, rose metal, cerobend, metal alloys, plastics and polymers.

6. The flywheel system of claim 4 wherein the means releases the liner by melting.

7. A energy-absorbing housing for a flywheel system comprising:
   a substantially cylindrical housing comprising a wall portion;
   a substantially cylindrical liner positioned within the housing;

a flywheel rotatably disposed within the liner; and, means contacting the wall portion and the liner for restraining the liner in relation to the housing when the liner is subjected to a torque below a predetermined threshold and releasing the liner when the liner is subjected to a torque substantially equal or greater than the predetermined threshold.

8. The energy-absorbing housing of claim 7 wherein the means forms a fluid film bearing between the liner and the wall portion when the liner is subjected to the torque substantially equal or greater than the predetermined threshold.

9. The energy-absorbing housing of claim 8 wherein the means comprises a restraining rib.

* * * * *